United States Patent

Josenhans

[15] 3,652,931

[45] Mar. 28, 1972

[54] INNATE OSCILLATOR NOISE DETERMINATION

[72] Inventor: James Gross Josenhans, Berkeley Heights, N.J.

[73] Assignee: Bell Telephone Laboratories, Incorporated, Berkeley Heights, N.J.

[22] Filed: Oct. 2, 1970

[21] Appl. No.: 77,658

[52] U.S. Cl. .......... 324/57, 331/78
[51] Int. Cl. .......... G01r 27/00
[58] Field of Search .......... 324/57; 179/1; 325/363, 474; 331/78

[56] References Cited

UNITED STATES PATENTS 3,351,853 11/1967 Wood .......... 324/57
3,388,326 6/1968 Brooks .......... 324/57

*Primary Examiner*—Edward E. Kubasiewicz
*Attorney*—R. J. Guenther and Arthur J. Torsiglieri

[57] ABSTRACT

A calibrated noise generator is coupled through a circulator to an oscillator circuit which contains the active negative resistance device having innate noise characterized by $M_o$. The oscillator is coupled through the circulator to an FM receiver whose output is directed to a frequency bandpass filter. The frequency bandpass filter is coupled to a power measuring meter. A measurement of the output power of the oscillator waveform after it is processed through the FM receiver and frequency bandpass filter is made with essentially no external noise power applied to the oscillator circuit. The noise signal from the noise generator is then increased until the output power meter reading is double the initial measurement. At this point the innate noise, $M_o$, of the active negative resistance device is known.

8 Claims, 2 Drawing Figures

INVENTOR
J. G. JOSENHANS
BY
Robert B Anderson
ATTORNEY

INNATE OSCILLATOR NOISE DETERMINATION

BACKGROUND OF THE INVENTION

This invention relates to the measurement of the innate noise of an active negative resistance device which forms part of an oscillator circuit.

The value of the noise generated internally by a device, such as a transistor or vacuum tube operated within a linear portion of its characteristics as in an amplifier, has been obtained by the use of a calibrated noise generator coupled to the input of the device under test. The output noise power of the device under test is first measured with the noise generator turned off and then the noise generator is turned on and adjusted until the measured output power from the device under test doubles. At this point, due to the linearity of the characteristics over which the device is operated, it is known that the noise power added must be equal to that of the device under test, and, therefore, by the use of a calibrated noise generator, the internal noise can be read directly from the generator dial setting.

The procedure outlined above for measuring the noise of a device operating within a linear portion of its characteristic has not to date been used to determine the noise of an active negative resistance oscillator device operating over a nonlinear portion of its characteristic. Apparently the nonlinear operation of this device would not result in a doubling of the power out for a corresponding doubling of the power into the oscillator and, therefore, the prior art measurement technique would not be expected to give meaningful results if applied to an oscillator circuit.

Producers of active negative resistance devices used in oscillator circuits generally only specify the total noise of the entire oscillator circuit and not the innate noise of the active device itself. The measurement techniques presently available for obtaining the innate noise of an active negative resistance oscillator device are complicated, time consuming, and of limited accuracy. These problems have made it undesirable to quote the innate noise of an active negative resistance device.

It is desirable to provide a quick and accurate determination of the innate noise of an active negative resistance device used as part of an oscillator circuit. This would allow the classification of the innate noise of a device undergoing an evolution of process changes to be clarified at each process step. It would also permit easy production line control for all active negative resistance type devices.

OBJECTS OF THE INVENTION

It is an object of this invention to provide a relatively quick and accurate measurement of the innate noise of an active negative resistance device in an oscillator circuit.

It is another object of this invention to permit the characterization of the innate noise of an active negative resistance device while it is undergoing an evolution of process changes so as to be able to minimize the innate noise.

It is still another object of this invention to provide a network and method which will permit the innate noise of an active negative resistance device used in an oscillator circuit to be more accurately and quickly determined than was possible in the prior art.

SUMMARY OF THE INVENTION

These and other objects of the invention are attained in an illustrative embodiment thereof comprising a calibrated noise generator-oscillator load resistor, an oscillator circuit containing an active negative resistance device to be evaluated, an FM teceivers, a frequency bandpass filter, and a power indicating device.

The active negative resistance device, which forms part of the oscillator circuit, has characteristic noise associated with it that causes undesirable frequency fluctuations about the natural frequency of oscillation, $f_o$, of the oscillator. A circulator can be used to couple the output of the calibrated noise generator-oscillator load resistor and an input of the FM receiver to the oscillator circuit. The output of the FM receiver is coupled to a frequency bandpass filter whose output is transmitted to a power meter.

The FM receiver substantially removes amplitude variations in the oscillator waveform and converts the noise created frequency fluctuations of the oscillator waveform into a voltage varying waveform which is processed through a frequency bandpass filter. The power content of the resulting waveform is the measured.

The calibrated noise generator-oscillator load resistor can be a simple resistor whose equivalent circuit is a noiseless ohmic resistor in series with a noise generator whose output is directly proportional to the resistor's temperature. By varying the temperature of the resistor, the noise generated by it can be accurately controlled.

Only two measurements are necessary to obtain the innate noise of the active negative resistance device. The first measurement is a reading of the output power of the oscillator circuit waveform after it has been processed through the FM receiver and frequency bandpass filter. During this first measurement a calibrated noise generator, which is coupled to the oscillator circuit, is essentially turned off. The noise generator is then turned on and its output increased until the measured output power is double the initial measurement. At this point the innate noise of the active negative resistance element is known to be equal to that noise being introduced into the oscillator by the noise generator.

These and other objects, features and advantages of the invention will be better understood from a consideration of the following detailed description taken in conjunction with the accompanying drawing.

DETAILED DESCRIPTION

Figure 1:
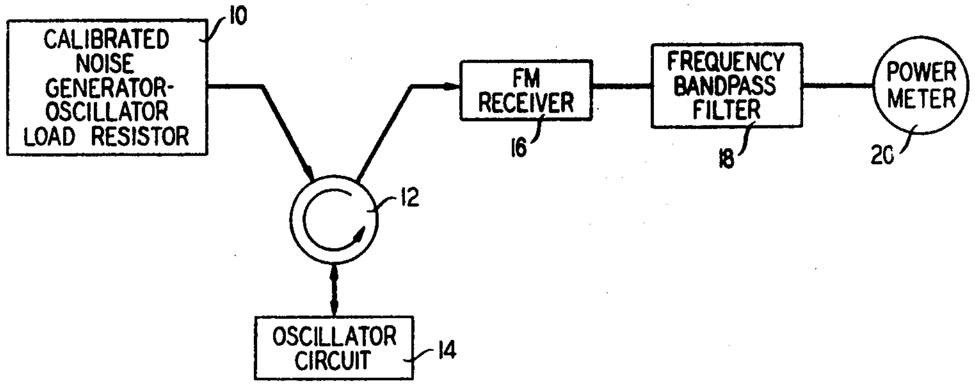
FIG. 1 is a circuit schematic in block diagram form of one embodiment of the invention.

FIG. 1 illustrates an embodiment of the invention which allows a rapid and accurate measurement of the equivalent noise temperature and, therefore, the innate noise, $M_o$, of an active negative resistance device used as part of an oscillator. A calibrated noise generator-oscillator load resistor 10 is coupled to an oscillator circuit 14 through a circulator 12, which serves as a nonreciprocal path for noise waveforms being emitted from the calibrated noise generator-oscillator load resistor to the oscillator circuit.

Figure 2:
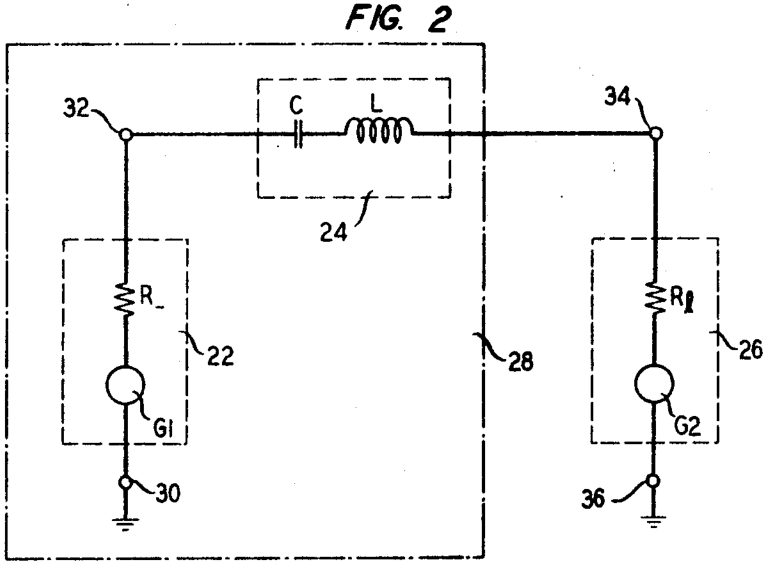
FIG. 2 shows the equivalent circuit of the calibrated noise generator-oscillator load resistor and oscillator circuit of FIG. 1.

The oscillator circuit 14 comprises an active negative resistance device which may be represented by equivalent circuit 22 of FIG. 2. The oscillator circuit's natural frequency of oscillation, $f_o$, is essentially determined by the equivalent series L–C network 24 illustrated in FIG. 2. Noise created by the active negative resistance device 22 causes undesirable frequency fluctuations about the natural frequency of oscillation, $f_o$, of the oscillator circuit.

The output waveform from the oscillator circuit 14 is directed to an FM receiver 16 by circulator 12. The FM receiver serves to substantially eliminate AM variations in the frequency varying waveform received from the oscillator circuit by limiting the amplitude of the received waveform; it also converts the frequency fluctuations of the oscillator waveform, which are due to noise signals superimposed on the natural frequency of oscillation, $f_o$, into a voltage varying waveform. A frequency bandpass filter 18 passes all frequency components of a waveform within a selected frequency range and greatly attenuates frequencies outside this range. A power meter 20, which is coupled to the frequency bandpass filter, measures the power content of the waveform transmitted by the filter.

As illustrated in FIG. 2, the negative resistor element 22 is the equivalent of a noiseless negative resistance, $R_-$, in series with a noise generator, $G_1$, which generates spontaneous fluctuation voltages with mean squared value $$\overline{v_{R_-}^2} = 4kT_x|R_-|(BW) \qquad (1)$$

where $T_x$ = The equivalent noise temperature of the active negative resistance device, $k$ = Boltzmann constant $$\left(1.38 \times \frac{10^{-23}\ \text{joules}}{\text{K}^\circ}\right)$$

$BW$ = Any arbitrary frequency bandwidth, $|R_-|$ = Ohmic value of negative resistance.

The calibrated noise generator oscillator load resistor 10 may be a simple ohmic resistance whose equivalent circuit 26, as illustrated in FIG. 2, consists of a noiseless resistor $R_l$ in series with a noise generator $G_2$ which generates spontaneous fluctuation voltages with mean squared value $$\overline{v_{R_l}^2} = 4kT_{R_l}R_l(BW) \qquad (2)$$

where $T_{R_l}$ = Temperature in degrees K. of the resistor, $R_l$ = Ohmic value of the oscillator load resistor.

For any frequency bandwidth, the value of $$\overline{v_{R_l}^2}$$

is directly proportional to the temperature of the oscillator load resistor. Therefore, when $$T_{R_l} = 0^\circ\text{K},\ \overline{v_{R_l}^2} = 0.$$

The value of $$\overline{v_{R_l}^2}$$

can be made approximately equal to zero if the resistor is placed in liquid hydrogen or some other suitably low temperature liquid gas.

In order to measure the equivalent noise temperature of the active negative resistance device, it is first necessary to lower the temperature of the load resistor, as previously discussed, so that there is substantially no noise waveform emitting from it. The waveform generated by the oscillator circuit is then transmitted through the FM receiver and the frequency bandpass filter and its power content is measured and the value recorded.

The temperature of the load resistor is now increased until the power meter reading is double the initial reading. At this point, the equivalent noise temperature of the active negative resistance device is equal to the temperature of the load resistor.

The innate noise, $M_o$, of an active negative resistance device is defined as the equivalent noise temperature, $T_x$, over $T_o$. A value of $T_o$ of 290° has been selected to conform with the standards appearing in the *Proceedings of the IRE*, "IRE Standards on Methods of Measuring Noise in Linear Twoports, 1959", Volume 48, No. 1, January, 1960, pages 60 through 68. Once $T_x$ has been determined, $M_o$ is also known since:

$$M_o = T_x/T_o\ . \qquad (3)$$

FIG. 2 shows an equivalent circuit of the oscillator circuit 28, an equivalent circuit of the calibrated noise generator-oscillator load resistor 26, and an equivalent series L–C network 24. The oscillator circuit 28 consists of an equivalent series L–C network 24 and an active negative resistance device 22 whose equivalent circuit is represented as a noiseless negative resistor $R_-$ in series with a noise generator $G_1$. Terminal 30 of the negative resistance noise source is shown grounded and terminal 32 of the negative resistance, $B_-$, is connected to the L–C network 24.

The L–C network determines the natural frequency of oscillation, $f_o$. It includes the small lead inductance and junction capacitance associated with the active negative resistance device and has negligible noise associated with it as compared to that generated by the active negative resistance device. The L–C network 24 is connected by terminal 34 to a load resistor 26 whose equivalent circuit is shown as an ideal noiseless resistor $R_l$ in series with a noise generator, $G_2$, which is grounded at terminal 36. In order to achieve $R_-$*oscillation, the magnitude of the ohmic value of the load resistor*, $R_l$, is made approximately equal to that of the negative resistance, $R_-$, of the active negative resistance device.

In one embodiment of the invention, a traveling wave amplifier is used as the calibrated noise generator-oscillator load resistor since its equivalent temperature can be raised beyond the range in which an ordinary resistor would be destroyed. A J-band circulator is used to couple the noise source to the oscillator circuit and the oscillator circuit to the FM receiver. Typical values for the equivalent capacitor and inductor illustrated in FIG. 2 are 0.16 pF and 4.4 nH, respectively. An IMPATT diode with a negative resistance of approximately −3 ohms and a load resistance of 3 ohms can be used. The natural frequency of oscillation using the above parameters is typically 6.06 GHz. but may be varied by changing the values of L and C. Typically, a frequency bandpass filter with a bandwidth of 100 Hz. is used.

It is not necessary in order to practice applicant's invention that the oscillator load resistor also serve as the noise generator. If the oscillator load resistor is placed in liquid hydrogen or some other suitable low temperature liquid gas and left there during all measurements, the amount of noise it introduces into the oscillator is insignificant compared to that introduced by the active negative resistance device. A reading of the output power without any applied external noise signal is first made and then external noise is applied and increased until the output noise power reading doubles. From the knowledge of the amount of externally applied noise power the value of $T_x$ and $M_o$ can be easily calculated.

It is intended that these embodiments described be merely for the purposes of illustration. Various other embodiments may be devised by those skilled in the art without departing from the spirit and scope of this invention.

I claim:

1. Apparatus for measuring the innate noise of an active device operated over a nonlinear portion of its characteristics as when used in an oscillator circuit comprising:
   - means for emitting a variable first noise signal;
   - an oscillator circuit substantially characterized by a natural frequency of oscillation, $f_o$;
   - said oscillator containing an active device having innate AM and FM noise associated with it;
   - means for coupling said emitting means to said oscillator circuit;
   - said natural frequency of oscillation of said oscillator circuit having frequency and amplitude fluctuations caused by said innate noise of said electronic device and said first noise signal;
   - means for eliminating substantially all AM fluctuations in said natural frequency of oscillation of said oscillator and converting said frequency variations into voltage variations;
   - means for coupling said oscillator signal to said AM eliminating and FM converting means;
   - a frequency bandpass filter;
   - means for coupling said AM eliminating and frequency converting means to said frequency bandpass filter;
   - means for measuring the power content of a voltage varying signal; and
   - means for coupling said frequency bandpass filter to said power measuring means.

2. The apparatus of claim 1 wherein the active device is an active negative resistance device.

3. The apparatus of claim 2 wherein said first coupling means is a circulator.

4. The apparatus of claim 1 wherein said emitting means is a resistor.

5. The apparatus of claim 4 wherein said resistor acts as a load resistance for said oscillator circuit.

6. The apparatus of claim 1 wherein said eliminating and converting means is an an FM receiver.

7. A method for obtaining the innate noise associated with an active negative resistance device by temporarily utilizing the device as a component in an oscillator circuit, the output waveform of which contains AM noise and frequency variations that are both produced by the innate noise associated with the device, comprising the sequence of steps of:

eliminating substantially all AM noise in the oscillator waveform;

converting the frequency variations of the resultant oscillator waveform into a first waveform characterized by voltage variations which are proportional to the frequency variations;

measuring the power content of the first waveform over a selected frequency range;

introducing an external noise signal into the oscillator circuit which produces AM noise and frequency variations in the oscillator waveform in addition to that produced by the device;

eliminating substantially all AM noise in the oscillator waveform to which external noise was added;

converting the frequency variations of the resultant oscillator waveform into a second waveform characterized by voltage variations which are proportional to the frequency variations;

measuring the power content of the second waveform over a selected frequency range; and utilizing the power measurements from the first and second waveforms to determine the innate noise associated with the device.

8. The method of claim 7 further comprising the step of adjusting the amount of said introduced noise signal into said oscillator circuit until the measured power output is double the value obtained when there was no external noise signal introduced.

* * * * *